United States Patent [19]

Kida et al.

[11] 4,369,298

[45] Jan. 18, 1983

[54] NOVEL CURED RESIN, PROCESS FOR PRODUCTION THEREOF, AND LENS COMPOSED OF SAID RESIN FROM BIS(ALKYLENEOXYPHENYL)-DIACRYLATE, BIS(ALKYLENEOXYPHENYL)DIALLYL ETHER, BIS(ALKYLENEOXYPHENYL)DIALLYL CARBONATE MONOMERS

[75] Inventors: Yasuji Kida, Kudamatsu; Kazuo Shikata, Tokuyama, both of Japan

[73] Assignee: Tokuyama Soda Kabushiki Kaisha, Yamaguchi, Japan

[21] Appl. No.: 265,421

[22] Filed: May 19, 1981

[30] Foreign Application Priority Data

May 27, 1980 [JP] Japan ................................. 55-69543
Jun. 5, 1980 [JP] Japan ................................. 55-74917
Mar. 9, 1981 [JP] Japan ................................. 56-32485

[51] Int. Cl.$^3$ ...................... C08F 12/24; C08F 216/12
[52] U.S. Cl. ................................. 526/313; 526/314
[58] Field of Search ............................. 526/313, 314

[56]       References Cited
         U.S. PATENT DOCUMENTS

| | | | |
|---|---|---|---|
| 2,455,652 | 12/1948 | Bralley et al. | 526/314 |
| 2,529,867 | 11/1950 | Carlson | 526/314 |
| 3,369,058 | 2/1968 | Keenan | 526/313 |
| 3,835,090 | 9/1974 | Gander et al. | 526/313 |
| 4,146,696 | 3/1979 | Bond et al. | 526/314 |

FOREIGN PATENT DOCUMENTS

| | | | |
|---|---|---|---|
| 491126 | 3/1953 | Canada | 526/314 |
| 2034721 | 6/1980 | United Kingdom | 526/313 |

*Primary Examiner*—William F. Hamrock
*Assistant Examiner*—Peter F. Kulkosky
*Attorney, Agent, or Firm*—Sherman & Shalloway

[57]                ABSTRACT

A cured resin consisting substantially of a first polymer unit derived from an unsaturated compound having two terminal vinyl groups consisting of bis(alkyleneoxyphenyl)-diacrylates or dimethacrylates, bis(alkyleneoxyphenyl)diallyl ethers, and bis(alkyleneoxyphenyl)diallyl carbonates, and a second polymer unit derived from another unsaturated compound radical-polymerizable with the first-mentioned unsaturated compound, said polymer units being bonded to each other at random.

The aforesaid cured resin can be producted by copolymerizing an intimate mixture consisting substantially of at least one compound selected from the first-mentioned unsaturated compounds having two terminal vinyl groups and prepolymers thereof and at least one compound selected from other unsaturated compounds radical-copolymerizable with the first-mentioned unsaturated compounds and prepolymers thereof in the presence of a radical polymerization initiator. A lens composed of the aforesaid cured resin has a high refractive index, excellent transparency and excellent fire retardancy.

31 Claims, No Drawings

NOVEL CURED RESIN, PROCESS FOR PRODUCTION THEREOF, AND LENS COMPOSED OF SAID RESIN FROM BIS(ALKYLENEOXYPHENYL)-DIACRYLATE, BIS(ALKYLENEOXYPHENYL)DIALLYL ETHER, BIS(ALKYLENEOXYPHENYL)DIALLYL CARBONATE MONOMERS

This invention relates to a novel cured resin, a process for production thereof, and to a lens composed of said resin.

Research work has been undertaken for many years about organic glasses for use in place of inorganic glasses. One of the most well known synthetic resins previously suggested as organic glasses is a polymer of diethylene glycol bis-allyl carbonate. This polymer, however, has a refractive index of as low as 1.49.

Polymers having a high refractive index for use as organic glasses have recently been proposed.

Japanese Laid-Open Patent Publication No. 77686/1979 disclose a transparent resin having a high refractive index which is a copolymer of (A) an unsaturated compound expressed by the following formula

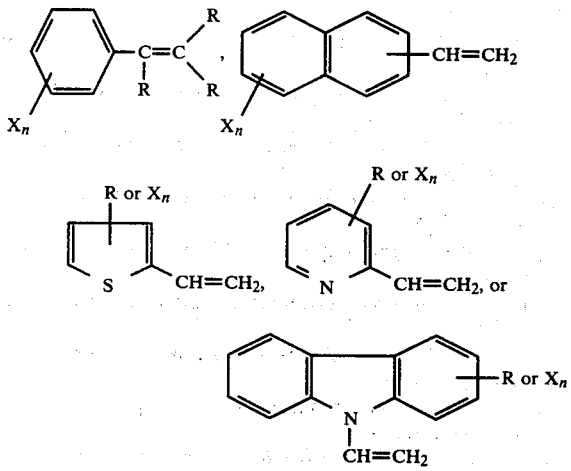

wherein $X_n$ represents 1 to 10 halogen atoms (Cl, Br, I) or methyl carbonyl groups, and R represents hydrogen, halogen or alkyl, and (B) a carbonate, an acrylic acid ester, a methacrylic acid ester, a methacrylate, or an acrylate. This patent document discloses transparent resins having a refractive index of 1.499 to 1.559 in working examples.

Japanese Laid-Open Patent Publication No. 13,747/1980 discloses a copolymer having a refractive index of at least 1.55, and a lens composed of this copolymer, said copolymer comprising as main components at least one first monomer represented by the following general formula

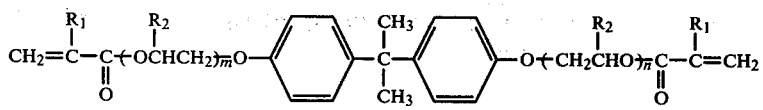

wherein $R_1$ represents hydrogen or a methyl group, $R_2$ represents hydrogen or a methyl group, and m and n are integers provided that the sum of m and n is from 0 to 4, and at least one second radical-polymerizable monomer whose homopolymer has a refractive index of at least 1.55. This Patent document discloses resins having a refractive index of 1.556 to 1.604.

Needless to say, resins having higher refractive indices are more desirable as materials for organic glasses.

Organic glasses find various applications not only as optical lenses, but also as prisms, dustproof glasses, windshield glasses, etc. Accordingly, it is very important for versatility and safety that organic glasses should have various useful properties, for example fire retardancy, for use in the respective fields in addition to having a high refractive index.

Addition of fire retardants to resins is the general practice of imparting fire retardancy to the resins. Since, however, resins containing fire retardants generally have reduced transparency and degraded properties, such a means for imparting fire retardancy cannot be applied to organic glasses, especially those used in the optical field.

It is an object of this invention therefore to provide a novel cured resin having a high refractive index, and suitable for use as organic glass, especially optical glasses.

Another object of this invention is to provide a cured resin having transparency and fire retardancy which can be used as organic glasses, particularly as optical glasses.

Still another object of this invention is to provide a lens composed of a cured resin having a high refractive index, excellent transparency and excellent fire retardancy.

Yet another object of this invention is to provide a process for producing the novel cured resin of the invention.

A further object of the invention is to provide a process for producing a high-quality lens made of the novel cured resin of the invention by a cast polymerization method with high productivity.

Other objects and advantages of the invention will become apparent from the following description.

According to one aspect of the invention, these objects and advantages of the invention are achieved by a cured resin composed of a first polymer unit derived from an unsaturated compound having two terminal vinyl groups expressed by the following general formula (I)

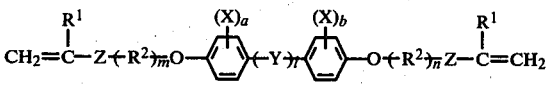

wherein $R^1$ is hydrogen or methyl, $R^2$ is

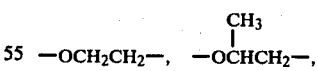

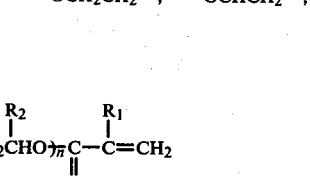

bis(Alkyleneoxyphenyl)diallyl ethers of the following formula

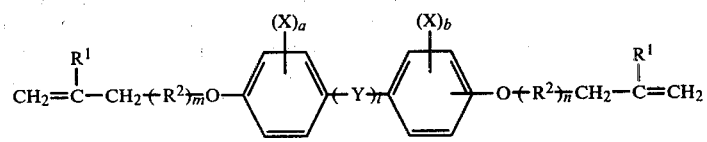

bis(Alkyleneoxyphenyl)diallyl carbonates of the following general formula

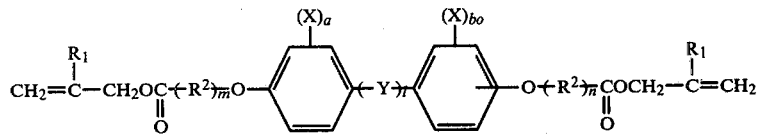

-continued $$-OCH_2CH-, \quad \text{or} \quad -OCH_2CHCH_2-,$$
$$\quad\quad |\quad\quad\quad\quad\quad\quad\quad\quad\quad |$$
$$\quad CH_3 \quad\quad\quad\quad\quad\quad\quad\quad OH$$

each of said groups being bonded to Z by its bond located on the left hand side on the sheet surface, Z represents —CO—, —CH$_2$—, or —CH$_2$OCO—, each of said groups being bonded by its bond located on the left hand side on the sheet surface to the carbon atom to which R$^1$ is bonded, X is halogen, Y is —O—, —SO$_2$—, —CH$_2$—, or

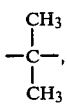

l is 0 or 1, m and n, independently from each other, are integer of 1 to 4, and a and b, independently from each other, are integers of 1 to 4, and a second polymer unit derived from another unsaturated compound radical-polymerizable with the first-mentioned unsaturated compound, said polymer units being bonded to each other at random.

According to this invention, the aforesaid cured resin can be produced by copolymerizing an intimate mixture consisting substantially of at least one compound selected from unsaturated compounds having two terminal vinyl groups and represented by the above general formula (I) and prepolymers thereof and at least one compound selected from other unsaturated compounds radical-copolymerizable with the first-mentioned unsaturated compounds and prepolymers thereof in the presence of a radical polymerization initiator.

In the general formula (I), R$^1$, R$^2$, Y, Z, a, b, l, m and n are as defined hereinabove, and need no further explanation. X is a halogen atom such as fluorine, chlorine, bromine or iodine, preferably chlorine or bromine.

For convenience, the compounds of general formula (I) can be classified into the following three groups by the definition of Z.

bis(Alkyleneoxyphenyl) diacrylates or dimethacrylates of the following formula

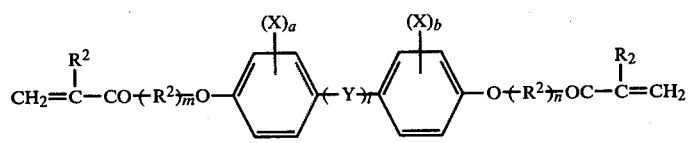

Examples of the bis(alkyleneoxyphenyl) diacrylates or dimethacrylates of general formula (I-1) include the following:
(100) 2,2-bis(4-methacryloxyethoxy-3-bromophenyl)-propane,
(101) 2,2-bis(4-methacryloxyethoxy-3-chlorophenyl)-propane,
(102) 2,2-bis(4-acryloxyethoxy-3-bromophenyl)propane,
(103) 2,2-bis(4-acryloxyethoxy-3-chlorophenyl)propane,
(104) 2,2-bis(4-methacryloxyethoxy-3,5-dibromophenyl)propane,
(105) 2,2-bis(4-methacryloxyethoxy-3,5-dichlorophenyl)propane,
(106) 2,2-bis(4-acryloxyethoxy-3,5-dibromophenyl)propane,
(107) 2,2-bis(4-acryloxyethoxy-3,5-dichlorophenyl)propane,
(108) 2,2-bis(4-methacryloxydiethoxy-3,5-dibromophenyl)propane.
(109) 2,2-bis(4-methacryloxydiethoxy-3,5-dichlorophenyl)propane,
(110) 2,2-bis(4-methacryloxypropoxy-3,5-dibromophenyl)propane,
(111) 2,2-bis(4-methacryloxypropoxy-3,5-dichlorophenyl)propane,
(112) 2,2-bis[4-methacryloxy(2-hydroxy)propoxy-3,5-dibromophenyl]propane,
(113) 2,2-bis[4-methacryloxy(2-hydroxy)propoxy-3,5-dichlorophenyl]propane,
(114) bis(4-methacryloxyethoxy-3-bromophenyl)sulfone,
(115) bis(4-methacryloxyethoxy-3-chlorophenyl)sulfone,
(116) bis(4-methacryloxyethoxy-3,5-dibromophenyl)sulfone,
(117) bis(4-methacryloxyethoxy-3,5-dichlorophenyl)sulfone,
(118) bis(4-methacryloxydiethoxy-3,5-dibromophenyl)sulfone, (119) bis(4-methacryloxydiethoxy-3,5-dichlorophenyl)-sulone,
(120) bis(4-methacryloxypropoxy-3,5-dibromophenyl)-sulfone,
(121) bis(4-methacryloxypropoxy-3,5-dichlorophenyl)-sulfone,
(122) bis(4-methacryloxyethoxy-3,5-dibromophenyl)ether,
(123) bis(4-methacryloxyethoxy-3,5-dichlorophenyl)ether,
(124) bis(4-methacryloxyethoxy-3,5-dibromophenyl)methane,
(125) bis(4-methacryloxyethoxy-3,5-dichlorophenyl)methane,
(126) bis(4-methacryloxypropoxy-3-bromophenyl)methane,
(127) bis(4-methacryloxypropoxy-3-dichlorophenyl)methane,
(128) bis[4-methacryloxy(2-hydroxy)propoxy-3,5-dibromophenyl]methane,
(129) bis[4-methacryloxy(2-hydroxy)propoxy-3,5-dichlorophenyl]methane,
(130) bis(4-methacryloxypropoxy-3,5-dibromophenyl)methane.

The compounds of general formula (I-1) can be obtained by a known esterification reaction by which an alcohol and an unsaturated carboxylic acid (e.g., methacrylic acid, acrylic acid) are heated in the presence of an acid catalyst to cause dehydrocondensation. Esters of formula (I-1) which have a hydroxyl group at the side chain can be obtained by the addition of an unsaturated carboxylic acid to the corresponding terminal epoxy compounds.

Examples of the bis(alkyleneoxyphenyl)diallyl ethers of general formula (I-2) are the following:
(200) 2,2-bis(4-allyloxyethoxy-3,5-dichlorophenyl)propane,
(202) 2,2-bis(4-allyloxyethoxy-3,5-dibromophenyl)propane,
(204) 2,2-bis(4-allyloxyethoxy-3-bromophenyl)propane,
(206) 2,2-bis(4-allyloxyethoxy-2,3,5,6-tetrabromophenyl)propane,
(208) 2,2-bis(4-methallyloxyethoxy-3-chlorophenyl)propane,
(210) 2,2-bis(4-allyloxydiethoxy-3,5-dibromophenyl)propane,
(212) 2,2-bis(4-allyloxytetraethoxy-3,5-dichlorophenyl)propane,
(214) 2,2-bis[4-allyloxypropoxy-3,5-dibromophenyl]propane,
(216) 2,2-bis[4-allyloxydipropoxy-3,5-dibromophenyl]propane,
(218) 2,2-bis[4-allyloxy(2-hydroxy)propoxy-3,5-dibromophenyl]propane,
(220) bis(4-methallyloxypropoxy-3,5-dibromophenyl)methane,
(222) bis(4-methallyloxyethoxy-3-bromophenyl)methane,
(223) bis(4-methallyloxyethoxy-3,5-dibromophenyl)methane,
(224) bis(4-allyloxyethoxy-3,5-dibromophenyl)sulfone,
(226) bis[4-allyloxy(2-hydroxy)propoxy-3,5-dibromophenyl]sulfone,
(228) bis(4-allyloxydiethoxy-3,5-dichlorophenyl)sulfone,
(232) 4,4'-di(allyloxyethoxy)-3,3',5,5'-tetrabromodiphenyl ether, and
(234) 4,4'-di[allyloxy(2-hydroxy)propoxy]3,3',5,5'-tetrabromodiphenyl.

The compounds of general formula (I-2) can be obtained by a known etherification reaction comprising heating allyl alcohol and a bis(alkyleneoxyphenyl) compound in the presence of an acid catalyst to induce dehydrocondensation. Or the corresponding ether compounds can be obtained by converting the phenolic hydroxyl groups of a bis(phenyl) compound to sodium alcoholate in the presence of a strong base and reacting the resulting compound with a terminal halogen derivative of a corresponding allyl compound to remove sodium chloride.

Examples of the bis(alkyleneoxyphenyl)diallyl carbonates of general formula (I-3) include the following:
(300) 2,2-bis(4-allyloxycarbonyloxyethoxy-3,5-dichlorophenyl)propane,
(302) 2,2-bis(4-allyloxycarbonyloxyethoxy-3-bromophenyl)propane.
(304) 2,2-bis(4-allyloxycarbonyloxyethoxy-3,5-dibromophenyl)propane,
(306) 2,2-bis(4-allyloxycarbonyloxyethoxy-2,3,5,6-tetrabromophenyl)propane,
(308) 2,2-bis(4-methallyloxycarbonyloxyethoxy-3-chlorophenyl)propane,
(310) 2,2-bis(4-allyloxycarbonyloxydiethoxy-3,5-dibromophenyl)propane,
(312) 2,2-bis(4-allyloxycarbonyloxytriethoxy-3,5-dibromophenyl)propane,
(314) 2,2-bis(4-allyloxycarbonyloxytetraethoxy-2,3,5-tribromophenyl)propane,
(316) 2,2-bis(4-allyloxycarbonyloxypropoxy-3,5-dichlorophenyl)propane,
(318) 2,2-bis(4-allyloxycarbonyloxypropoxy-3,5-dibromophenyl)propane,
(319) 2,2-bis(4-allyloxycarbonyloxyethoxy-2,3,5,6-tetrabromophenyl)propane,
(320) 2,2-bis(4-allyloxycarbonyloxydipropoxy-2,3,5,6-tetrabromophenyl)propane,
(322) 2,2-bis[4-allyloxycarbonyloxy(2-hydroxy)propoxy-3,5-dichlorophenyl]propane,
(326) bis(4-methallyloxycarbonyloxyethoxy-3-bromophenyl)methane,
(327) bis(4-methallyloxycarbonyloxypropoxy-3,5-dibromophenyl)methane,
(328) bis(4-allyloxycarbonyloxyethoxy-3,5-dibromophenyl)sulfone,
(330) bis(4-allyloxycarbonyloxypropoxy-3,5-dibromophenyl)sulfone,
(332) bis[4-allyloxycarbonyloxy(2-hydroxy)propoxy-3,5-dibromophenyl]sulfone,
(334) bis(4-allyloxycarbonyloxydiethoxy-3,5-dibromophenyl)sulfone,
(338) 4,4'-di(allyloxycarbonyloxyethoxy)-3,3',5,5'-tetrabromodiphenyl ether, and
(340) 4,4'-di(allyloxycarbonyloxyethoxy)-3,3',5,5-tetrabromodiphenyl.

The compounds of general formula (I-3) can be obtained, for example, by a known carboxylation reaction which comprises dehydrochlorinating condensation of allyl chloroformate and the corresponding alcohol component in the presence of a basic catalyst.

The unsaturated compounds of general formula (I) having two terminal vinyl groups may be used singly or as a mixture of two or more. The propoxy group and the (2-hydroxy)propoxy group in the specific nomenclature of the compounds of general formula (I) means groups respectively represented by the following formulae

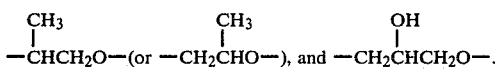

In the process of this invention, the unsaturated compound of general formula (I) may be pre-polymerized and used as a prepolymer. The prepolymer may be a homopolymer of one such unsaturated compound or a coprepolymer of two or more of such unsaturated compounds. The prepolymer can be produced by polymerizing at least one such unsaturated compound under heat or optionally in the presence of a radical-polymerization initiator until the reaction mixture is about to be gelled. Since the prepolymer has a higher viscosity than the corresponding unsaturated compound, it has the advantage that in cast polymerization, leakage of the unsaturated monomer from a casting mold can be prevented and the shrinkage of a crosslinked resin caused by the polymerization can be reduced.

In the process of this invention, another unsaturated compound radical-polymerizable with the aforesaid unsaturated compounds is used in combination with the first-mentioned unsaturated compound having two terminal vinyl groups.

The other unsaturated compound is used in order to impart a high refractive index, fire retardancy, excellent mechanical properties or improved other properties to the cured resins provided by the present invention, or to reduce the rate of polymerization at the time of obtaining the cured resin. In order to obtain an especially high refractive index, it is preferred to use unsaturated compounds whose homopolymers have a refractive index of at least 1.55, preferably at least 1.57.

Investigations of the present inventors have shown that one preferred group of the other unsaturated compounds which can be used in the process of this invention can include compounds having one vinyl group and one substituted or unsubstituted phenyl or naphthyl group per molecule.

Examples of such preferred compounds are styrene, $\alpha$-($C_1$-$C_3$)alkylstyrenes, vinylnaphthalene, allylbenzene, p-diisopropenylbenzene, allylnaphthalene, phenyl acrylate, 3,3-diphenyl-1-propane, naphthyl acrylate, phenyl methacrylate, naphthyl methacrylate, benzyl acrylate, allylphenyl carbamate, benzyl methacrylate, phenylbutene, and the nuclearly substituted products thereof. Examples of substituents on the rings of the nuclearly substituted products include lower alkyl groups such as methyl, lower alkoxy groups such as methoxy, a hydroxyl group, and halogen atoms such as chlorine, bromine and iodine. Specific examples of these compounds are styrene and its nuclearly substituted products, such as styrene, vinyltoluene, methoxystyrene, chlorostyrene, bromostyrene, iodostyrene, dichlorostyrene, dibromostyrene, trichlorostyrene, and tribromostyrene; $\alpha$-$C_1$-$C_3$ alkylstyrenes and their nuclearly substituted products, such as $\alpha$-methylstyrene, isopropenyltoluene, chloro-$\alpha$-methylstyrene, isopropenyl phenol, $\alpha$-ethylstyrene, and $\alpha$-isopropylstyrene; substituted products thereof such as 1-vinylnaphthalene, 2-vinylnaphthalene and isopropenylnaphthalene; allylbenzene and its nuclearly substituted products, such as allylbenzene, allyltoluene, allylxylene and allylnaphthalene; phenyl acrylate and its nuclearly substituted products, such as phenyl acrylate, methoxyphenyl acrylate, dibromophenyl acrylate and pentabromophenyl acrylate; naphthyl acrylate and its nuclearly substituted products, such as $\alpha$-naphthyl acrylate and $\beta$-naphthyl acrylate; phenyl methacrylate and its nuclearly substituted products such as phenyl methacrylate, chlorophenyl methacrylate, dichlorophenyl methacrylate, trichlorophenyl methacrylate, bromophenyl methacrylate, dibromophenyl methacrylate and tribromophenyl methacrylate; naphthyl methacrylate and its nuclearly substituted derivatives, such as $\alpha$-naphthyl methacrylate and $\beta$-naphthyl methacrylate; benzyl acrylate and its nuclearly substituted products thereof such as benzyl acrylate, chlorobenzyl acrylate, bromobenzyl acrylate and dibromobenzyl acrylate; benzyl methacrylate and its nuclearly substituted products, such as benzyl methacrylate, chlorobenzyl methacrylate, dichlorobenzyl methacrylate, pentachlorobenzyl methacrylate, bromobenzyl methacrylate, dibromobenzyl methacrylate, tribromobenzyl methacrylate, and pentabromobenzyl methacrylate; and phenylbutenes and its nuclearly substituted products, such as 3-phenyl-1-butene, 4-phenyl-1-butene and 4-tolyl-1-butene.

Another preferred group of the other unsaturated compounds that can be used conveniently in the process of this invention includes diesters of aliphatic diols, preferably alkylene glycols having 2 to 4 carbon atoms or polyalkylene glycols, and acrylic or methacrylic acid, and diallyl esters of dicarboxylic acids.

Examples of such compounds are diesters of aliphatic diols or polyalkylene glycols and acrylic or methacrylic acid, such as ethylene glycol dimethacrylate, ethylene glycol diacrylate, diethylene glycol dimethacrylate, diethylene glycol diacrylate, triethylene glycol dimethacrylate, triethylene glycol diacrylate, tetraethylene glycol dimethacrylate, propylene glycol dimethacrylate, propylene glycol diacrylate and 1,4-butanediol dimethacrylate; and diallyl esters of dicarboxylic acids, such as diallyl phthalate, diallyl terephthalate, diallyl isophthalate, diallyl tartrate, diallyl epoxysuccinate and diallyl maleate.

Examples of other unsaturated compounds which can be equally used in the process of this invention include methacrylate compounds such as methyl methacrylate, 2-hydroxyethyl methacrylate, hydroxybenzyl methacrylate and ethyleneglycol bis-[3-methacryloxy(2-hydroxy)propyl ether]; and compounds having an allyl group within the molecule, such as diethylene glycol bis(allyl carbonate), allyl cinnamate, allyl salicylate and allylphenyl carbamate.

If desired, a compound of general formula in which X corresponds to a hydrogen atom may also be used together in the process of this invention.

The process of this invention is carried out by copolymerizing the unsaturated compound (I) having two terminal vinyl groups and/or its prepolymer and the other unsaturated compound and/or its prepolymer in the presence of a radical-polymerization initiator.

In order to impart especially superior fire retardancy to the resulting cured resin, it is preferred to use a compound having one vinyl group and one halogen-substituted phenyl or naphthyl group within the molecule or its prepolymer as the other unsaturated compound or its prepolymer. Even when the other unsaturated compound or its prepolymer does not contain a halogen atom in the molecule, similarly excellent fire retardancy can be imparted by using a larger proportion of the unsaturated compound of formula (I) having two terminal vinyl groups, or using an unsaturated compound of formula (I) having two terminal vinyl groups and a large number of halogen substituents.

When the other unsaturated compound is a diester of an alkylene glycol or polyalkylene glycol with acrylic or methacrylic acid, a diallyl ester of a dicarboxylic acid, methyl methacrylate, 2-hydroxyethyl methacrylate, pentabromophenyl methacrylate, ethylene glycol bis[3-methacryloxy(2-hydroxy)propyl ether], hydroxybenzyl methacrylate, diethylene glycol bis(allyl carbonate), or allyl cinnamate, there can be obtained cured resins which have excellent impact strength, transparency, weatherability, dyeability and which processability and are suitable for use in making lenses.

The rate of polymerization can be decreased by using as the other unsaturated compound, an $\alpha$-$C_1$-$C_3$ alkylstyrene or its nuclearly substituted product, allylbenzene, allylstyrene or its nuclearly substituted products, p-diisopropenylbenzene, 3,3-diphenyl-1-propene, 3-phenyl-1-butene, 4-phenyl-1-butene, 4-tolyl-1-butene, allyl cinnamate, allyl salicylate, or allylphenyl carbamate. The use of such unsaturated compounds can prevent the reaction system from being abruptly gelled with the initiation of the polymerization, and therefore, the formation of a cured resin having an uneven surface can be advantageously avoided. The initial-stage polymerization is performed slowly to prolong the time which elapses until the reaction mixture is gelled. As a result, a cured resin having a good surface condition free from unevenness can be produced. This is especially advantageous in the production of the cured resin of this invention which is molded in the form of a lens by a cast polymerization method to be described below.

Such other unsaturated compounds which reduce the rate of polymerization are those of which homopolymers have a refractive index of at least 1.55. The decrease of the rate of polymerization brought about by the useof these unsaturated compounds is about 10% or more as compared with the case of not using such unsaturated compounds.

In the process of this invention, 1 to 99% by weight, preferably 5 to 95% by weight, of the unsaturated compound (I) having two terminal vinyl groups and/or its prepolymer, and 99 to 1% by weight, preferably 95 to 5% by weight, of the other unsaturated compound or its prepolymer can be used on the basis of the total amount of these.

In one preferred embodiment of this invention in which the aforesaid other unsaturated compounds which reduce the rate of polymerization is used, the process of this invention can be performed advantageously by using such other unsaturated compound for reducing the rate of polymerization and another unsaturated compound. The unsaturated compound for reducing the rate of polymerization is used in an amount of 0.1 to 10% by weight, preferably 0.5 to 8% by weight, based on the total amount of the unsaturated compound (I) having two terminal vinyl groups and/or its prepolymer and the other unsaturated compound excepting the unsaturated compound for reducing the rate of polymerization. The process of this invention is performed by copolymerizing an intimate mixture consisting substantially of the unsaturated compound (I) having two terminal vinyl groups and/or its prepolymer and the other unsaturated compound and/or its prepolymer in the presence of a radical polymerization initiator.

The reaction proceeds by merely heating the mixture, but may be carried out under the irradiation of active light such as ultraviolet light or ionizing radiation. Radical polymerization methods known per se can be employed.

There is no particular limitation on the radical polymerization initiator, and any known radical polymerization initiators can be used. Typical examples include diacyl peroxides such as benzoyl peroxide, p-chlorobenzoyl peroxide, 2,4-dichlorobenzoyl peroxide, decanoyl peroxide, lauroyl peroxide and acetyl peroxide; percarbonates such as diisopropylperoxy dicarbonate, di-sec.butylperoxy dicarbonate and di-2-ethylhexylperoxy dicarbonate; alkyl peresters such as t-butylperoxy 2-ethylhexanate and t-butylperoxy pivalate; and azo compounds such as azobisisobutyronitrile. The amount of the radical polymerization initiator differs depending upon the type of polymerization, the polymerization conditions, the type of the other unsaturated compound, etc., and cannot be definitely specified. Generally, the suitable amount is 0.05 to 10% by weight, preferably 0.1 to 8% by weight, based on the total amount of the monomers.

The polymerization method in this invention is not particularly critical, and any known methods of polymerization can be used. One typical preferred method is a cast polymerization method which comprises injecting the aforesaid intimate monomeric mixture containing the radical polymerization initiator between molds held by an elastomer gasket or a spacer, for example, curing the mixture in an air furnace, and then withdrawing the product. Alternatively, the monomers may be pre-polymerized in the presence of the polymerization initiator, to increase the viscosity of the monomers, and then the monomers may be subjected to the cast polymerization.

Among the polymerization conditions, the temperature particularly affects the properties of the resulting resin having a high refractive index. The temperature cannot be definitely specified because it is affected by the types and amounts of the monomers and the type of the polymerization initiator. Generally, it is preferred to start the polymerization at a relatively low temperature, raise the temperature gradually, and at the end of the polymerization, cure the product at a high temperature (so-called tapered two-stage polymerization). Since the polymerization time differs depending upon the various conditions, it is proper to determine the optimum time according to these conditions. Preferably, the conditions are generally so selected that the polymerization is completed in 2 to 40 hours.

As required, the polymerization may be performed in the co-presence of various stabilizers and other additives such as a mold releasing agent, ultraviolet absorber, antioxidant, coloration inhibitor, antistatic agent, or fluorescent dye.

Thus, according to this invention, there is provided a cured resin consisting substantially of a first polymer unit derived from the unsaturated compound of general formula (I) and a second polymer unit derived from the other unsaturated compound radical-polymerizable with the unsaturated compound of general formula (I), said polymer units being bonded to each other at random.

The cured resin of this invention contains 1 to 99% by weight, preferably 5 to 95% by weight, of the polymer unit derived from the unsaturated compound of general formula (I) and 99 to 1% by weight, preferably 95 to 5% by weight, of the polymer unit derived from the other unsaturated compound based on the total weight of these.

The cured resin of this invention is a colorless transparent and fire-retardant resin having a light transmittance of at least 83%. The resin has a refractive index of at least 1.55, and resins having a refractive index of more than 1.60 can easily be obtained, as desired, according to the present invention. Accordingly, when the cured resin of this invention is used as a plastic lens, the lens can be made very thin and light in weight, and has excellent brightness. Since the cured resin has a crosslinked structure, it can be machined. This is another reason for which the resin of the invention is suitable for production of lenses. The resin also has the advantage of being easily dyed with disperse dyes.

The following Examples illustrate the present invention more specifically.

The properties of the cured resin obtained in these examples were measured by the following methods.

(1) Refractive index ($n_D^{20}$)

The refractive index of a specimen at 20° C. was measured by an Abbe's refractometer using monobromonaphthalene as a contact liquid.

(2) Fire retardancy (flame resistance)

A test specimen, 2 mm thick, 10 mm wide and 130 mm long, was fixed vertically, and the flame of a Bunsen burner was contacted with its free end for 20 seconds. The burning condition was observed, and evaluated on the following standards:

⊚ : When the flame was removed away, the fire instantaneously ceased.

○ : When the flame was removed away, the fire ceased before it reached a 25 mm indicator line from the free end.

Δ: When the flame was removed away, the fire continued to spread beyond the 25 mm indicator line but ceased before it reached a 100 mm indicator line.

X: When the flame was removed away, the fire continued to spread beyond the 100 mm indicator line.

(3) Light transmittance (abbreviated "$T_t$")

The light transmittance of a 2 mm-thick specimen was measured by means of a hazemeter (a product of Toyo Seiki Seisakusho).

(4) Hardness (abbreviated "$R_L$")

The hardness of a 2 mm-thick specimen was measured by means of a Rockwell hardness tester on an L-scale.

(5) Machinability

A specimen, 5 mm thick and 100 mm in diameter, was machined by a grinder, and the result was evaluated as follows:

○ : The specimen could be machined, and the cut dust was non-sticky.

Δ: The specimen could be machined, but the cut dust was sticky.

X: When the specimen was machined, melt-adhesion occurred owing to heat.

(6) Dyeability

With thorough stirring, a dye solution consisting of 0.2% of a disperse dye (Kayalon Polyester Blue GRF, a trademark) 1% of a carrier and a surface-active agent (Nikkol SBL-4N, a trademark) was heated to 85° C. A specimen, 2 mm in thickness and 700 mm in diameter, was dipped for 10 minutes to dye it.

The dyed specimen was rinsed with water, and its dyed state was observed visually. When dyeing was found to be sufficient, the dyeability of the specimen was rated " ○ ".

(7) The surface condition of a cast-polymerized product

The surfaces (front and back) of a cast polymerized product were well observed, and its surface condition was evaluated as follows:

⊚ : Both surfaces were smooth.

○ : Very slight unevenness was noted.

Δ: Slight but clear unevenness was noted.

X: Unevenness was noted throughout the surfaces.

In the following examples, unsaturated compounds having two terminal groups are indicated by the compound numbers given hereinabove, and the other unsaturated compounds by the following abbreviations. The parenthesized figures in the following are the refractive indices ($n_D^{20}$) of homopolymers of the respective compounds.

CSt: chlorostyrene (1.610)
St: styrene (1.588)
ACM: allyl cinnamate (1.585)
DEGBAC: diethylene glycol bis(allyl carbonate) (1.498)
AMA: allyl methacrylate (1.520)
TEGDMA: tetraethylene glycol dimethacrylate (1.498)
DAIP: diallyl isophthalate (1.570)
EGBMHPE: ethylene glycol bis[3-methacryloxy(2-hydroxy)propyl ether (1.500)
HEMA: hydroxyethyl methacrylate (1.512)
DAP: diallyl phthalate (1.572)
NMA: methylmethacrylate (1.490)
α-MSt: α-methylstyrene (1.605)
PETTA: pentaerythritol triacrylate (1.508)
TAC: triallyl cyanurate (1.557)
DAES: diallyl epoxysuccinate (1.516)
BPAGMA: bisphenol A-bisglycidyl methacrylate (1.565)
DEGDMA: diethylene glycol dimethacrylate (1.500)

EXAMPLE 1

CSt (a mixture of 65% by weight of an o-isomer and 35% by weight of a p-isomer) and compound No. 104 were added in the amounts shown in Table 1, and 0.05 part by weight of diisopropylperoxy dicarbonate was mixed well with these compounds. The mixture was injected into a mold consisting of glass plates having a diameter of 73 mm and an ethylene/vinyl acetate copolymer gasket, and subjected to cast polymerization in an air furnace. Initially, the polymerization was performed at 30° C. for 4 hours, and the temperature was gradually raised to 50° C. over 10 hours, and thereafter, the temperature was raised to 70° C. over 1 hour. The polymerization was carried out further at 70° C. for 1 hour. The gasket of the ethylene/vinyl acetate copolymer was removed, and then the polymerization was carried out at 100° C. for 30 minutes. After the polymerization, the mold was withdrawn from the air furnace and allowed to cool. The resulting polymer was peeled off from the glass plate of the mold, and examined for various properties. The results are shown in Table 1 (Runs Nos. 1 to 5).

COMPARATIVE EXAMPLE 1

Example 1 was repeated except that 2,2-bis(4-methacryloxyethoxyphenyl)propane (to be abbreviated "BMEPP") was used instead of the compound No. 104. The results are shown in Table 1 (Runs Nos. 6 to 10).

It is seen from Table 1 that the resins of the invention have higher refractive indices and better fire retardancy than the resins prepared for comparison, and that even when the amount of the compound No. 104 is increased, the refractive index of the resulting resin can be maintained higher than in the case of adding using BEMPP.

TABLE 1

| Run No. | Amounts of the monomers (parts by weight) | Refractive index $[n_D^{20}]$ | Fire retardancy | Light transmittance |
|---|---|---|---|---|
| 1 | Compound No. 104/CSt (10/90) | 1.608 | O | 89 |
| 2 | Compound No. 104/CSt (30/70) | 1.606 | O | 89 |
| 3 | Compound No. 104/CSt (50/50) | 1.603 | ◉ | 89 |
| 4 | Compound No. 104/CSt (70/30) | 1.600 | ◉ | 89 |
| 5 | Compound No. 104/CSt (80/20) | 1.599 | ◉ | 89 |
| 6 | BMEPP/CSt (10/90) | 1.604 | Δ | 89 |
| 7 | BMEPP/CSt (30/70) | 1.594 | X | 89 |
| 8 | BMEPP/CSt (50/50) | 1.584 | X | 90 |
| 9 | BMEPP/CSt (70/30) | 1.580 | X | 90 |
| 10 | BMEPP/CSt (80/20) | 1.570 | X | 90 |

EXAMPLE 2

Run No. 2 of Example 1 was repeated except that each of the unsaturated compounds having two terminal vinyl groups shown in Table 2 was used instead of the compound No. 104. The results are shown in Table 2.

TABLE 2

| Run No. | Amounts of the monomers (parts by weight) | Refractive index $[n_D^{20}]$ | Fire retardancy | Light transmittance |
|---|---|---|---|---|
| 1 | Compound No. 100/CSt (30/70) | 1.599 | ◉ | 89 |
| 2 | Compound No. 105/CSt (30/70) | 1.598 | O | 89 |
| 3 | Compound No. 101/CSt (30/70) | 1.597 | Δ | 89 |

EXAMPLE 3

Cast polymers were produced in the same way as in Example 1 using the various monomers shown in Table 3. The properties of the resulting polymers are shown in Table 3.

TABLE 3

| Run No. | Amounts of the monomers (parts by weight) | Refractive index $[n_D^{20}]$ | Fire retardancy | Light transmittance |
|---|---|---|---|---|
| 1 | Compound No. 106/St (50/50) | 1.590 | ◉ | 90 |
| 2 | Compound No. 110/St (60/40) | 1.598 | ◉ | 89 |
| 3 | Compound No. 112/St (90/10) | 1.605 | ◉ | 89 |
| 4 | Compound No. 130/St (60/40) | 1.598 | ◉ | 89 |
| 5 | Compound No. 122/St (60/40) | 1.600 | ◉ | 89 |
| 6 | Compound No. 116/CSt (70/30) | 1.607 | ◉ | 89 |
| 7 | Compound No. 120/St (60/40) | 1.600 | ◉ | 89 |

TABLE 3-continued

| Run No. | Amounts of the monomers (parts by weight) | Refractive index $[n_D^{20}]$ | Fire retardancy | Light transmittance |
|---|---|---|---|---|
| 8 | Compound No. 108/St (90/10) | 1.602 | ◉ | 89 |

EXAMPLE 4

One hundred parts by weight of a monomeric mixture consisting of 30% by weight of compound No. 104 and 70% by weight of St was well mixed with 3 parts by weight of allyl cinnamate and 0.2 part by weight of diisopropylperoxy dicarbonate. The mixture was injected into a mold consisting of glass plates having a diameter of 73 cm and a gasket of an ethylene/vinyl acetate copolymer, and subjected to cast polymerization in an air furnace. The polymerization was performed by gradually raising the temperature from 30° C. to 50° C. over 18 hours. Then, the temperature was raised to 70° C. over 1 hour, and the polymerization was further carried out at 70° C. for 1 hour. The gasket of the ethylene/vinyl acetate was removed, and the polymerization was further carried out at 100° C. for 30 minutes. After the polymerization, the mold was withdrawn from the air furnace, and allowed to cool. The polymer was stripped off from the mold. The polymer was found to have a refractive index ($n_D^{20}$) of 1.606 and a very good surface condition (◉) and be fire-retardant.

EXAMPLE 5

Each of the unsaturated compounds having two terminal vinyl groups (first monomers) and the other unsaturated compounds (second monomers) shown in Table 4 were mixed in the amounts indicated, and each of the resulting mixture was mixed with each of the third monomers shown in Table 4 in the amounts indicated. Then resulting mixture was polymerized in the same way as in Example 4. The results are shown in Table 4.

TABLE 4

| Run No. | Amounts of the first and second monomers (parts by weight) | Third monomer Type | Third monomer Amount (parts by weight) | Refractive index $[n_D^{20}]$ | Surface condition | Surface hardness ($R_L$) | Light transmittance |
|---|---|---|---|---|---|---|---|
| 1 | Compound No. 104/St (60/40) | DEGBAC | 2 | 1.598 | ◉ | — | 89 |
| 2 | Compound No. 104/St (60/40) | AMA | 3 | 1.595 | ◉ | — | 90 |
| 3 | Compound No. 104/St (60/40) | TEGDMA | 3 | 1.591 | ◉ | — | 90 |
| 4 | Compound No. 104/St (60/40) | DAIP | 5 | 1.595 | ◉ | — | 90 |
| 5 | Compound No. 104/St (60/40) | EGBMHPE | 1 | 1.596 | ◉ | — | 89 |
| 6 | Compound No. 104/St (60/40) | HEMA | 1 | 1.596 | ◉ | — | 89 |
| 7 | Compound No. 104/CSt (30/70) | α-MSt | 1 | 1.594 | O | 108 | 89 |
| 8 | Compound No. 104/CSt (30/70) | α-MSt | 3 | 1.595 | ◉ | 110 | 90 |
| 9 | Compound No. 106/CSt (30/70) | ACM | 3 | 1.606 | ◉ | — | 89 |

EXAMPLE 6

Each of the monomers shown in Table 5 was added in the proportions indicated to compound No. 304, and 100 parts of the resulting monomeric mixture was well mixed with 3 parts of benzoyl peroxide at 70° C. The mixture was fully deaerated, and injected into a mold composed of two glass plates heated at 70° C. and a gasket of an ethylene/vinyl acetate copolymer, and thus subjected to cast polymerization in an air furnace.

The polymerization was first carried out at 70° C. for 4 hours. The temperature was gradually raised to 100° C. over 4 hours, and the polymerization was further carried out at 100° C. for 4 hours. After the polymerization, the mold was withdrawn from the air furnace, and allowed to cool. The polymer was stripped off from the glass plates of the mold, and examined for various properties. The results are shown in Table 5.

TABLE 5

| Run No. | Monomer | (amount, wt. %) | Surface condition | $n_D^{20}$ | $R_L$ | Machin-ability | Dye-ability | Fire-retard-ancy | Light trans-mittance |
|---|---|---|---|---|---|---|---|---|---|
| 1 | DEGBAC | (13) | ◉ | 1.590 | 119 | ○ | ○ | ◉ | 90 |
| 2 | DAP | (13) | ○ | 1.601 | 120 | ○ | ○ | ◉ | 89 |
| 3 | MMA | (10) | ○ | 1.594 | 115 | ○ | ○ | ◉ | 90 |
| 4 | HEMA | (20) | — | 1.580 | 112 | ○ | ○ | ◉ | 90 |
| 5 | St | (20) | — | 1.600 | 124 | ○ | ○ | ◉ | 89 |
| 6 | PETTA | (5) | ○ | 1.598 | 120 | ○ | ○ | ◉ | 89 |
| 7 | TAC | (10) | — | 1.600 | 119 | ○ | ○ | ◉ | 89 |
| 8 | DAES | (10) | ◉ | 1.596 | 121 | ○ | ○ | ◉ | 89 |
| 9 | DIAP | (20) | ◉ | 1.595 | 124 | ○ | ○ | ◉ | 90 |

EXAMPLE 7

Each of the monomeric mixtures shown in Table 6 was polymerized in the same way as in Example 1. The results are shown in Table 6.

TABLE 6

| Run No. | Amounts of the monomers (parts by weight) | Surface condition | Refractive index $[n_D^{20}]$ | $R_L$ | Machin-ability | Dye-ability | Fire retard-ancy | Light trans-mittance |
|---|---|---|---|---|---|---|---|---|
| 1 | Compound No. 312/BPAGMA (90/10) | ◉ | 1.590 | 116 | ○ | ○ | ◉ | 90 |
| 2 | Compound No. 308/DEGDMA (95/5) | ◉ | 1.600 | 120 | ○ | ○ | ○ | 89 |
| 3 | Compound No. 319/DEGBAC (80/20) | ◉ | 1.600 | 123 | ○ | ○ | ◉ | 89 |
| 4 | Compound No. 328/DAP (90/10) | ◉ | 1.600 | 122 | ○ | ○ | ◉ | 89 |
| 5 | Compound No. 338/DEGBAC (80/20) | ◉ | 1.582 | 120 | ○ | ○ | ◉ | 90 |
| 6 | Compound No. 318/DEGBAC (80/20) | ◉ | 1.595 | 121 | ○ | ○ | ◉ | 89 |
| 7 | Compound No. 310/DAIP (80/20) | ◉ | 1.587 | 116 | ○ | ○ | ◉ | 90 |
| 8 | Compound No. 329/DAIP (80/20) | ◉ | 1.594 | 120 | ○ | ○ | ◉ | 90 |

EXAMPLE 8

Each of the monomers shown in Table 7 was added in the proportions indicated to compound No. 202, and the mixture was polymerized in the same way as in Example 1. The results are shown in Table 7.

TABLE 7

| Run No. | Monomer | (weight %) | Surface condition | $n_D^{20}$ | $R_L$ | Machin-ability | Dye-ability | Fire retard-ancy | Light trans-mittance |
|---|---|---|---|---|---|---|---|---|---|
| 1 | DEGBAC | (13) | ◉ | 1.592 | 118 | ○ | ○ | ◉ | 90 |
| 2 | DAP | (13) | ◉ | 1.600 | 121 | ○ | △ | ◉ | 89 |
| 3 | MMA | (10) | ○ | 1.597 | 113 | ○ | ○ | ◉ | 89 |
| 4 | HEMA | (10) | ○ | 1.594 | 111 | ○ | ○ | ◉ | 90 |
| 5 | St | (5) | ○ | 1.602 | 119 | ○ | ○ | ◉ | 89 |
| 6 | PETTA | (5) | ◉ | 1.598 | 117 | ○ | ○ | ◉ | 89 |
| 7 | TAC | (10) | ○ | 1.600 | 120 | ○ | ○ | ◉ | 89 |
| 8 | DAES | (10) | ◉ | 1.598 | 120 | ○ | ○ | ◉ | 89 |

EXAMPLE 9

Each of the monomeric mixtures shown in Table 8 was polymerized in the same way as in Example 1. The results are shown in Table 8.

TABLE 8

| Run No. | Monomeric mixture (parts by weight) | Surface condition | $[n_D^{20}]$ | $R_L$ | Machin-ability | Dye-ability | Light trans-mittance |
|---|---|---|---|---|---|---|---|
| 1 | Compound No. 210/BPAGMA (95/5) | ◉ | 1.600 | 119 | ○ | ○ | 89 |
| 2 | Compound No. 218/DEGBAC (90/10) | ◉ | 1.590 | 114 | ○ | ○ | 90 |
| 3 | Compound No. 218/DAP (95/5) | ◉ | 1.600 | 118 | ○ | ○ | 89 |
| 4 | Compound No. 218/MMA (95/5) | ◉ | 1.591 | 118 | ○ | ○ | 90 |
| 5 | Compound No. 224/DAP (95/5) | ◉ | 1.605 | 121 | ○ | ○ | 89 |
| 6 | Compound No. 224/DEGBAC (95/5) | ◉ | 1.601 | 123 | ○ | ○ | 89 |

EXAMPLE 10

Each of the monomeric mixtures shown in Table 9 was polymerized in the same way as in Example 1. The results are shown in Table 9.

TABLE 9

| Run No. | Monomeric mixture (parts by weight) | Surface condition | $n_D^{20}$ | $R_L$ | Machinability | Dyeability | Fire retardancy | Light transmittance |
|---|---|---|---|---|---|---|---|---|
| 1 | Compound No. 214/DAIP (80/20) | ◉ | 1.596 | 127 | ○ | ○ | ◉ | 89 |
| 2 | Compound No. 223/DEGBAC (90/10) | ◉ | 1.592 | 116 | ○ | ○ | ◉ | 90 |
| 3 | Compound No. 220/DAP (80/20) | ◉ | 1.595 | 119 | ○ | ○ | ◉ | 90 |
| 4 | Compound No. 232/DAIP (80/20) | ◉ | 1.593 | 120 | ○ | △ | ◉ | 90 |

What we claim is:

1. A cured resin consisting substantially of a first polymer unit derived from an unsaturated compound having two terminal vinyl groups represented by the following general formula

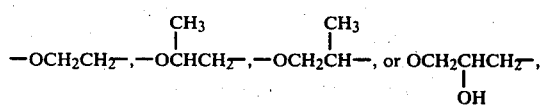

wherein $R^1$ is hydrogen or methyl, $R^2$ is

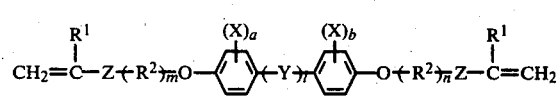

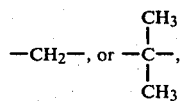

each of said groups being bonded to Z by its bond located on the left hand side on the sheet surface, Z represents —CO—, —CH$_2$—, or —CH$_2$OCO—, each of said groups being bonded by its bond located on the left hand side on the sheet surface to the carbon atom to which $R^1$ is bonded, X is halogen, Y is —O—, —SO$_2$—, —CH$_2$—, or $$-\overset{\overset{CH_3}{|}}{\underset{\underset{CH_3}{|}}{C}}-,$$

l is 0 or 1, m and n, independently from each other, are an integer of 1 to 4, and a and b, independently from each other, are integers of 1 to 4, and a second polymer unit derived from another unsaturated compound radical-polymerizable with the first-mentioned unsaturated compound, said polymer units being bonded to each other at random.

2. The resin of claim 1 wherein the unsaturated compound having two terminal vinyl groups is represented by the following formula

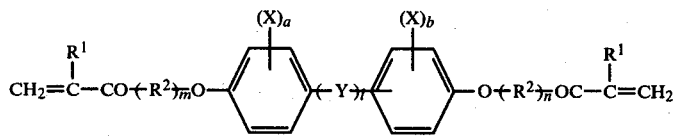

wherein $R^1$, $R^2$, X, Y, a, b, l, m and n are as defined.

3. The resin of claim 1 wherein the unsaturated compound having two terminal vinyl groups is represented by the following formula

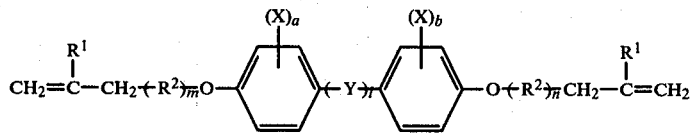

wherein $R^1$, $R^2$, X, Y, a, b, l, m and n are as defined.

4. The resin of claim 1 wherein the unsaturated compound having terminal vinyl groups is represented by the following formula

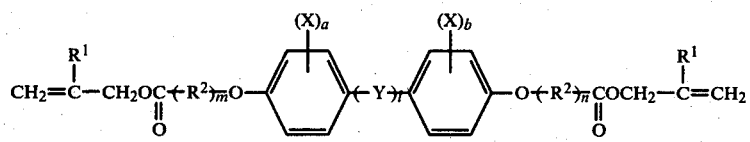

wherein $R^1$, $R^2$, X, Y, a, b, l, m and n are as defined.

5. The cured resin of any one of claims 1 to 4 wherein X in the formula representing the unsaturated compound having two terminal vinyl groups is chlorine or bromine.

6. The resin of claim 1 wherein the other unsaturated compound is a compound having one vinyl group and one substituted or unsubstituted phenyl or naphthyl group in the molecule.

7. The resin of claim 6 wherein the substituted phenyl or naphthyl group contains a lower alkyl group, a lower alkoxy group, a hydroxyl group or a halogen atom as the substituent.

8. The resin of claim 6 wherein the substituent of the substituted phenyl or naphthyl group is methyl, methoxy, hydroxy, chlorine or bromine.

9. The resin of claim 1 or 6 wherein the other unsaturated compound is selected from the group consisting of styrene, α-C$_1$-C$_3$ alkylstyrenes, vinylnaphthalene, allylbenzene, p-diisopropenylbenzene, allylnaphthalene, phenyl acrylate, 3,3-diphenyl-1-propene, naphthyl acrylate, phenyl methacrylate, naphthyl methacrylate, benzyl acrylate, benzyl methacrylate, allylphenyl carbamate, phenylbutene, the nuclearly substituted products thereof, and the mixtures thereof.

10. The resin of claim 1 wherein the other unsaturated compound is selected from the group consisting of diesters of alkylene glycols or polyalkylene glycols with acrylic or methacrylic acid, diallyl esters of dicarboxylic acids, and the mixtures thereof.

11. The resin of claim 10 wherein the other unsaturated compound is the diester of an alkylene glycol which is ethylene glycol, propylene glycol or 1,4-butanediol.

12. The resin of claim 10 wherein the other unsaturated compound is the diester of a polyalkylene glycol which is diethylene glycol, triethylene glycol or tetraethylene glycol.

13. The resin of claim 10, 11 or 12 wherein the dicarboxylic acid is phthalic acid, isophthalic acid, tartaric acid, maleic acid or epoxysuccinic acid.

14. The resin of claim 1 wherein the other unsaturated compound is selected from the group consisting of methyl methacrylate, 2-hydroxyethyl methacrylate, hydroxybenzyl methacrylate, ethylene glycol bis[3-methacryloxy(2-hydroxy)propyl ether], diethylene glycol bis(allyl carbonate), allyl cinnamate, allyl salicylate, and the mixtures thereof.

15. The resin of any one of claims 1, 2, 3, 4, 6, 10 or 14 wherein the proportion of the first polymer unit derived from the unsaturated compound having two terminal vinyl groups is 1 to 99% by weight, and the proportion of the second polymer unit derived from the other unsaturated compound is 99 to 1% by weight, based on the total weight of these polymer units.

16. The resin of claim 15 wherein the proportion of the first polymer unit derived from the unsaturated compound having two terminal vinyl groups is 5 to 95% by weight, and the proportion of the second polymer unit derived from the other unsubstituted compound is 95 to 5% by weight, based on the total weight of these polymer units.

17. The resin of claim 1 which has a refractive index of at least 1.55.

18. The resin of claim 16 which has a refractive index of at least 1.57.

19. The resin of claim 1 which has a light transmittance of at least 83%.

20. The resin of claim 18 which has a light transmittance of at least 85%.

21. A process for producing a cured resin, which comprises copolymerizing an intimate mixture consisting essentially of at least one compound selected from unsaturated compounds having two terminal vinyl groups represented by the following formula

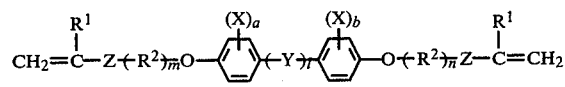

wherein $R^1$ is hydrogen or methyl, $R^2$ is

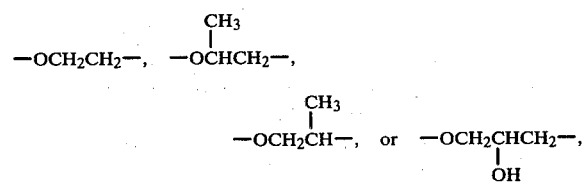

each of said groups being bonded to Z by its bond located on the left hand side on the sheet surface, Z represents —CO—, —CH$_2$—, or —CH$_2$OCO—, each of said groups being bonded by its bond located on the left hand side on the sheet surface to the carbon atom to which $R^1$ is bonded, X is halogen, Y is —O—, —SO$_2$—,

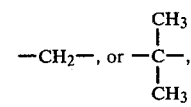

$l$ is 0 or 1, m and n, independently from each other, are an integer of 1 to 4, and a and b, independently from each other, are integers of 1 to 4, and prepolymers thereof, and at least one compound selected from other unsaturated compounds radical-polymerizable with the first-mentioned unsaturated compounds and prepolymers thereof, in the presence of a radical polymerization initiator.

22. The process of claim 21 wherein the other unsaturated compound is selected from the group consisting of compounds having one vinyl group and one substituted or unsubstituted phenyl or naphthyl group in the molecule, diesters of alkylene glycols or polyalkylene glycols and acrylic or methacrylic acid, diallyl esters of dicarboxylic acids, methyl methacrylate, 2-hydroxyethyl methacrylate, hydroxybenzyl methacrylate, ethylene glycol bis[3-methacryloxy(2-hydroxy)propyl ether], p-diisopropenylbenzene, 3,3-diphenyl-1-propene, allyl cinnamate, allyl salicylate, allylphenyl carbamate, and the mixtures thereof.

23. The process of claim 21 or 22 wherein the other unsaturated compound is a mixture of at least two different other unsaturated compounds, and at least one of them is an unsaturated compound capable of reducing the rate of polymerization selected from the group consisting of α-$C_1$-$C_3$ alkylstyrenes, the nuclearly substituted products thereof, allylbenzene, allylstyrene, the nuclearly substituted products thereof, p-diisopropenylbenzene, 3,3'-diphenyl-1-propene, 3-phenyl-1-butene, 4-phenyl-1-butene, 4-tolyl-1-butene, allyl cinnamate, allyl salicylate and allylphenyl carbamate.

24. The process of claim 21 wherein the amount of the unsaturated compound having two terminal vinyl groups and/or the prepolymer thereof is 1 to 99% by weight, and the amount of the other unsaturated compound and/or the prepolymer thereof is 99 to 1% by weight, based on the total weight of these compounds.

25. The process of claim 24 wherein the amount of the unsaturated compound having two terminal vinyl groups and/or the prepolymer thereof is 5 to 95% by weight, and the amount of the other unsaturated compound and/or the prepolymer thereof is 95 to 5% by weight, based on the total weight of these compounds.

26. The process of claim 23 wherein the amount of the unsaturated compound capable of reducing the rate of polymerization is 0.1 to 10% by weight based on the total weight of the unsaturated compound having two terminal vinyl groups and the other unsaturated compound excepting the unsaturated compound capable of reducing the rate of polymerization.

27. A lens composed of the cured resin of claim 1.

28. The resin of claim 1 wherein Y in the formula is —O—.

29. The cured resin of claim 1 wherein Y in the formula is —SO₂—.
30. The cured resin of claim 1 wherein Y in the formula is —CH₂—.
31. The cured resin of claim 1 wherein Y in the formula is
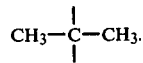
* * * * *

UNITED STATES PATENT AND TRADEMARK OFFICE
CERTIFICATE OF CORRECTION

PATENT NO. : 4,369,298
DATED : January 18, 1983
INVENTOR(S) : YASUJI KIDA, ET AL.

It is certified that error appears in the above-identified patent and that said Letters Patent is hereby corrected as shown below:

Column 17, line 64, correct to read:

"$\ell$ is 0 or 1, m and n, independently from each other, are"

Column 18, lines 23, 34 and 46, correct to read:

"where $R^1$, $R^2$, X, Y, a, b, $\ell$, m and n are as defined."

Column 20, line 14, correct to read:

"$\ell$ is 0 or 1, m and n, independently from each other, are"

Signed and Sealed this

Nineteenth Day of March 1985

[SEAL]

Attest:

DONALD J. QUIGG

Attesting Officer     Acting Commissioner of Patents and Trademarks